3,684,731
PROCESS FOR PREPARING COPPER RESIST-
ANT SILVER ACTIVATED ZINC SULFIDE
PHOSPHORS
James O. Frey, Towanda, and Henry B. Minnier, Dushore,
Pa., assignors to Sylvania Electric Products Inc.
No Drawing. Filed Oct. 8, 1970, Ser. No. 79,312
Int. Cl. C09k 1/12
U.S. Cl. 252—301.6 S
6 Claims

ABSTRACT OF THE DISCLOSURE

An improvement in the process for preparing silver-activated zinc sulfide phosphors, which imparts to the phosphor a copper resistance, which comprises adjusting the pH of the phosphor-water wash slurry from about 7.5 to about 9.5 and agitating for a given period of time, before filtering and drying the phosphor.

BACKGROUND OF THE INVENTION

Field of the invention

This invention relates to an improved process for preparing phosphor compositions. More particularly, it relates to an improved process for preparing silver-activated zinc sulfide phosphors which are copper resistant.

Background of the invention

Since the advent of color television, the tube manufactures have been troubled with copper contamination of the silver-activated zinc sulfide blue-emitting phosphor component. The phenomenon occurs during the manfacturing of the television screen, when copper-containing dust from the factory lands on the blue-emitting phosphor of a partially fabricated screen. Upon the subsequent baking of the screen, the copper on the blue-emitting phosphor activates the phosphor and causes the color emission of the phosphor to shift from blue to green. These spots cannot be detected until the final inspection of the tube, where they appear as a white spot under excitation. Such tubes are subsequently rejected, at significant cost to the manufacturer.

Fluxes such as ammonium chloride and sodium phosphate were added to the phosphor in an attempt to eliminate the copper contamination, but met with little or no success.

Alkaline-earth chloride fluxes, especially magnesium chloride are reported in U.S. Pat. No. 1,166,875. Although these fluxes appear to render the phosphor copper resistant, magnesium is not completely removed when the phosphor is washed. As a result, tube manufacturers then have a problem of fogging, that is, the phosphor has a tendency to adhere between the dots.

It is believed, therefore, that an improvement in the process for preparing silver-activated zinc sulfide phosphors, which renders the phosphor copper resistant, and is not detrimental to the manufacture of the screen is an advancement in the art.

SUMMARY OF THE INVENTION

In accordance with one aspect of this invention, there is provided an improvement in the process for preparing silver-activated zinc sulfide phosphors. The improvement comprises adjusting the pH of the phosphor-water wash slurry to a pH of from about 7.5 to about 9.5 and agitating said slurry for a least about 10 minutes before filtering and drying said phosphor.

DETAILED DESCRIPTION OF THE PREFERRED EMBODIMENTS

For a better understanding of the present invention, together with other and further objects, advantages, and capabilities thereof, reference is made to the following disclosure and appended claims in connection with the above description of some of the aspects of the invention.

Referring now to the invention with greater particularity, the process for rendering silver-activated zinc sulfide phosphors copper resistant is to adjust the pH of the phosphor-water wash slurry from about 7.5 to about 9.5 and to agitate the slurry for at least about 10 minutes before filtering and drying the phosphor.

Generally, most basic compounds, that is, compounds with a pH higher than about 7.5 when dissolved in water, can be used. Examples of these are the hydroxides and carbonates of the alkaline-earth metals, sodium and lithium. Preferred, however, is sodium hydroxide, especially as about a 5% by weight solution. When sodium hydroxide is in solution form, the pH of the phosphor-water wash slurry can be more readily controlled.

Care must be taken to maintain the pH of the slurry from about 7.5 to about 9.5. Below a pH of about 7.5, essentially no copper resistancy occurs. Above about 8.0 is generally preferred and 9 to 9.5 renders the phosphor essentially copper resistant. Although the phosphor is essentially completely copper resistant at pH's greater than about 9.5, difficulties such as poor phosphor to glass adherence are encountered in manufacturing screens when the pH is greater than about 9.5.

Two basic materials that are generally avoided are ammonium compounds and potassium compounds. The ammonium would evaporate during the bake-out at about 450° C., and not make the phosphor copper resistant. The presence of potassium has been known to darken phosphors and can be detrimental to the filaments in the television tube.

The slurry should be agitated by any conventional means known by one skilled in the art for at least about 10 minutes. Preferred times of from about 10 minutes to about 30 minutes insures that the slurry is uniformly adjusted to the desired pH. Although longer periods of time than about 30 minutes can be used, they are generally avoided for economic reasons. Especially preferred is about 15 minutes of agitation time.

Some tube manufacturers, depending on how they apply the phosphors, prefer silver-activated zinc sulfide phosphors coated with silica or a pyrophosphate to improve handling characteristics of the phosphor. This invention can be used on both coated and uncoated silver-activated zinc sulfide phosphors.

In order to more fully illustrate the preferred embodiments of this invention, the following detailed examples are given. All parts, proportions and percentages are by weight unless otherwise given.

EXAMPLE 1

In order to evaluate this invention for copper resistance, a testing procedure for copper contamination is used to simulate the phenomenon as it actually occurs in the factory. This consists of an electrical arc, from a cathode to a plate of copper, enclosed in a compartment wherein a phosphor to be tested could be placed. The phosphor is slurried with polyvinyl alcohol in a 100 mm. petri dish and is placed, along with an untreated phosphor which serves as a control, in the compartment. The electrical arc is applied for about 5 minutes, the two samples are removed, and baked at about 450° C. for about one hour. The dishes are allowed to cool to ambient temperature and checked under 3650 A. excitation for the appearance of copper activation of the zinc sulfide phosphor. Copper activation will appear white against the blue emission of the silver-activated zinc sulfide phosphor.

This procedure is carried out for all the examples and the results are qualitative as a pure visual result.

Silver-activated zinc sulfide phosphor is prepared by normal phosphor techniques, whereby the constituents are mixed in the proper proportions, fired and washed. The pH of the phosphor-water wash slurry is adjusted to about 9.5 with about a 5% by weight solution of sodium hydroxide. The slurry is agitated for about 15 minutes, filtered and dried. When subjected to the heretofore-mentioned copper resistance check, the pH adjusted phosphor is about 7 times more copper resistant than the untreated control as is apparent by the equivalent reduction in white areas.

EXAMPLE 2

Silver-activated zinc sulfide phosphor is prepared by normal phosphor techniques, whereby the constituents are mixed in the proper proportions, fired, washed and silica coated. The pH of the phosphor-water wash slurry is adjusted to about pH 9 with sodium hydroxide. The slurry is agitated for about 15 minutes, filtered and dried. When subjected to the heretofore-mentioned copper resistance check, the pH adjusted phosphor is about 7 to about 8 times more copper resistant than the untreated control.

EXAMPLE 3

Silver-activated zinc sulfide phosphor is prepared by normal phosphor techniques, whereby the constituents are mixed in the proper proportions, and fired. The fired phosphor is slurried with water and a magnesium salt, for example, magnesium chloride, is added. The pH of the slurry is immediately adjusted to about 9.5 with a 5% by weight solution of sodium hydroxide. The slurry is agitated for about 15 minutes, and a pyrophosphate, for example, sodium pyrophosphate is added. The resultant magnesium-pyrophosphate-coated phosphor is filtered and dried. When subjected to the heretofore-mentioned copper resistance check, the pH-adjusted phosphor is about 10 to about 12 times more copper resistant than the untreated control. When the pH is in the 7.5 to 9.0 range a corresponding decrease in copper resistancy occurs.

While there has been shown and described what at present are considered the preferred embodiments of the invention, it will be obvious to those skilled in the art that various changes and modifications may be made therein without departing from the scope of the invention as defined by the appended claims.

What is claimed is:

1. In the process for producing silver-activated zinc sulfide cathodoluminescent phosphors, wherein the constituents are mixed in proper proportions, fired, washed, filtered, and dried, the improvement which comprises adjusting the pH of the phosphor-water wash slurry to a pH of from about 7.5 to about 9.5 with an aqueous solution of a material selected from the group consisting of sodium and lithium hydroxides and carbonates and agitating said slurry at said pH for at least about 10 minutes before filtering and drying said phosphor.

2. A process according to claim 1 wherein said pH is from about 8.0 to about 9.5.

3. A process according to claim 1 wherein said pH is from about 9.0 to about 9.5.

4. A process according to claim 3, wherein said pH is adjusted with sodium hydroxide.

5. A process according to claim 4, wherein said pH is adjusted with about a 5% by weight solution of sodium hydroxide.

6. A process according to claim 5, wherein said agitation is for about 10 minutes to about 30 minutes.

References Cited

UNITED STATES PATENTS

| | | | |
|---|---|---|---|
| 2,854,413 | 9/1958 | Geary | 252—301.6 S |
| 2,758,941 | 8/1956 | Crosby et al. | 252—301.6 S X |
| 3,062,750 | 11/1962 | Umberger et al. | 252—301.6 S |

TOBIAS E. LEVOW, Primary Examiner

J. COOPER, Assistant Examiner